Patented Aug. 1, 1944

2,355,031

UNITED STATES PATENT OFFICE 2,355,031

STABILIZATION OF SUGAR-CONTAINING FOOD COMPOSITIONS

Sidney Musher, New York, N. Y., assignor to Musher Foundation Incorporated, New York, N. Y., a corporation of New York No Drawing. Application February 14, 1944, Serial No. 522,387

7 Claims. (Cl. 99—134)

The present invention relates to unusual stabilizers for sugar containing food compositions and particularly to the stabilization of those high sugar containing food compositions which are normally subject to stickiness particularly in humid and warm weather.

Foods having a relatively high sugar content, particularly when exposed to warm temperatures such as to summer weather or to humid conditions will become sticky and adhere to the paper wrapper or to anything with which the food comes in contact. For example, cake and sweet roll icings after being applied to the surface of the cake absorb some of the moisture of the freshly baked cake and after the cake has been packaged the icing, particularly in warm weather or under humid conditions of storage, adheres to the waxed or Cellophane type wrapper.

In connection with such products as cough drops or hard candies, these normally must be wrapped in waxed paper in order to prevent the candies from sticking to one another or to the paper wrapper and in spite of these precautions stickiness still occurs.

Furthermore in many of the high sugar containing food compositions such as candies and confections, icings, jellies and jams, and macaroons it is desirable to develop certain body and texture characteristics producing a high viscosity and other desirable physical characteristics.

It has been customary to utilize for this purpose various ingredients or combinations thereof such as gelatin, sodium alginate, algin, pectin, agar, Irish moss, psyllium seed, gum tragacanth and India gum, which materials are not only quite expensive but which do not give fully satisfactory results in many cases.

An object of the present invention is therefore to provide a stabilizer and ingredient for sugar containing food compositions and particularly for food icings, candies and confections and the like which will provide desirable physical characteristics and physical stabilization.

Another object is to provide this stabilization by economical and readily available means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a certain fraction of oats has been properly separated from the oat grain and finely divided, it may be incorporated as an ingredient and stabilizer in a sugar containing food compositions such as in candies and confections, food icings, and the like to give desirable physical characteristics, retardation of or protection against stickiness, and good viscosity characteristics.

These unusual properties are not to be found in the oat grain as a whole or in ordinary oat products as, for example, in oat flour made by grinding oat groats or in pulverized oats or oat hulls. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized to such an extent that at least 50% and desirably 80% to 90% will pass through a screen or mesh or bolting cloth having a fineness in excess of about 60 mesh and desirably having a fineness in excess of 70 mesh.

The ground groats are then separated as by aspirating or screening into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and most desirably between 80% and 90% of the total weight of the ground oat groats.

The coarse residue which is left after such grinding and screening or bolting or after aspirating is then finely divided and is found to contain the properties most desirable for incorporation in sugar containing food compositions containing at least about 20% sugar, the stabilizing effect being most particularly observed after the coarse fraction has all been ground to a fineness of at least 50 mesh and most desirably to at least 60 mesh.

This effect is not evident or evidenced when the whole oats are ground and utilized as such or when the oat flour made by grinding oat groats is utilized as such because of the fact that other constituents therein render ineffective the unusual stabilizing or gummy properties of the ground, relatively high protein and relatively low starch containing dehulled oat fraction of the present invention. The unusual stabilizing or gummy properties described herein are obtainable only by the use of the novel oat product of the present invention, which novel oat product is obtained in accordance with the procedures outlined herein.

In the preferred procedure the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desired be continued by regrinding, rescreening or reaspiration until the relatively high starch material has been largely removed leaving the relatively high protein fraction behind desirably to be ground to at least 60 mesh for use in accordance with the procedures of the present invention.

The coarse fraction obtained should desirably have a protein content of at least 20% and more desirably in excess of 22%. At the same time the starch content of the coarse fraction will be reduced to much less than the starch content of the fine fraction.

According to one method of separating the relatively high starchy fraction which is necessary to obtain the unusual properties in most highly developed condition, the groats are ground so that a major proportion thereof, say at least 50% to 80%, will have a fineness in excess of about 60 mesh and desirably at least 60% to 70% of the ground material will have a sufficient fineness to go through about a 90 mesh screen.

Then the ground material is screened, preferably through a fine silk screen or aspirated to remove all particles which will not go through a 60 mesh screen.

A most highly desirable method is to grind the oat groats until over 75%, and desirably between 80% and 90% will go through a 70 mesh screen but wherein the balance of between 10% and 20% remains on the screen. Then the ground groats are aspirated or screened to remove all the coarse particles and to separate the fine fraction comprising 80% to 90% from the coarse fraction comprising the balance of 10% to 20%. The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is then ground or pulverized such as in a hammer or stone or attrition mill to a particle size of at least about 50 mesh and more desirably so that all the ground coarse particles will now go through a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

After the special oat fraction has been removed and desirably finely divided from each total batch that is made the entire quantity may be blended or thoroughly mixed in order to assure obtaining a perfectly uniform product which will produce in a uniform degree the desirable results of the present invention.

This material although very different in composition, qualities and chemical structure from gelatin, sodium alginate, algin, pectin, Irish moss and psyllium seed, when added to a high sugar containing food composition results in a food composition having most desirable physical properties.

Moreover, the stabilizing action given by this particular fraction of oats is given by neither the oat flour produced by grinding oat groats nor by starch.

Moreover, the product produced in accordance with the present invention has not been found replaceable by any other fraction of oats, or by any other type of cereal or its fractions, including wheat or its fractions, corn or its fractions, barley or its fractions, rye or its fractions, rice or its fractions, or other types of cereals which the applicant has carefully studied.

Although the chemical composition may vary it has been found that at least 20% protein should be present and most desirably 22% protein. Highly desirable materials have been made containing 25% to 29% protein.

It has been found possible, where desired, to bleach this special oat fraction with chlorine or hypochlorite to lighten its color. It is also possible to obtain this bleaching effect with reducing agents such as sulfites but these reducing agents are not as effective as the oxidizing bleaching agents.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water.

The special oat fraction of the present invention is desirably added in a small proportion of less than about 10% and preferably less than 5% by weight. The food composition should contain at least about 20% sugar and most desirable results are obtained where the food composition has 40% or more sugar.

Among the sugars which may be present in the food composition there are included sucrose, dextrose, glucose, lactose, corn syrup, molasses or similar sweetening agent.

The best results from the standpoint of stabilization and also the development of non-sticking characteristics are obtained where the special oat fraction is added to the sugar containing food composition followed by heating to an elevated temperature such as to in excess of about 150° F. and preferably to at least 200° F.

For example, in the manufacture of cake icings the special oat fraction of the present invention overcomes the problem of the icings becoming sticky which is particularly observed during warm or humid weather. The special oat fraction also appears to prevent the formation of moisture droplets at the surface of the icing resulting from the icing absorbing moisture from the freshly baked cake.

For cake icings it has been found highly desirable to use between about 1% and 3% of the special oat fraction against the weight of the icing mix. For white icings the special oat fraction may be added with the other ingredients during the creaming process whereas for chocolate icings the special oat fraction is desirably added during the heating of the icing.

Icings of this sort are generally composed of sugar, water and flavoring material such as vanilla, vanillin, chocolate and similar products. The special oat fraction is preferably mixed with the dry sugar before being added to the icing and particularly where added before heating a "dry," high viscosity composition is obtained having unusual desirable physical characteristics and being resistant to stickiness.

In sweet roll icings similar results are observed, the amount of the special oat fraction used being dependent upon the degree of stabilization desired. Many of these icings will contain as much as 75% to 85% total sugars and the higher the sugar content the more effective the special oat fraction of the present invention appears to become.

Similarly in the manufacture of candies and confections the finely divided special oat fraction may be used, for example, in chocolate coatings to give improved spreading and dipping qualities to the chocolate and to retard blooming.

The finely divided special oat fraction has special uses for fondants, gum drops, cream and marshmallow fillings, cough drops, toffees, marshmallows, nougats, fruit drops and other hard candies and similar candy and confection materials. For example, in the case of hard candies, stickiness at warm temperatures or high humidities is extremely common, consequently producing an unsightly package presenting a most difficult packaging problem.

Another serious problem in the case of hard candies as well as many other high sugar containing foods is the susceptibility of the product to "graining" whereby the sugar crystallizes out and a grainy candy or confection is obtained.

For these products, there may be added thereto a small proportion of 1% or even less up to about 10% or 15% of the unusual oat fraction of the present invention to overcome the graining problem as well as to protect against stickiness. The unusual oat fraction is desirably added before the boiling procedure or the elevated temperature treatment such as to 235° F. to 245° F. to which these products are normally subjected while the sugar content is being raised to the desired proportion, frequently to as much as 90% or more.

Furthermore, in the manufacture of fudge, a coarse grain frequently develops due to improper crystallization or to excessive heating or to long storage with subsequent evaporation, which problems are also overcome by the incorporation of a small amount of the special oat fraction of the present invention.

In products like marshmallow filling the finely divided special oat fraction may be employed in replacement for corn syrup to give a high quality marshmallow product and still retain desirable physical characteristics on the basis of using, for example, from 0.25% to 3.0% of the special oat fraction in lieu of 10% or more of corn syrup normally employed.

Marshmallows are also subject to stickiness when exposed to high humidities or warm temperatures. There is also the problem of drying out, and sugar crystallization and graining which is overcome by the use of the special oat fraction.

These candies may also be protected against sweating resulting in unsightly appearance and running together by the incorporation of a small amount of the special oat fraction.

In the manufacture of jams, jellies and jelly fillings, which are all herein referred to as "jelly compositions," where pectin is normally employed the special oat fraction may be used in partial or complete replacement for the pectin to give high viscosity and stabilization. The special oat fraction retains its desirable physical characteristics even under conditions of low pH such as when added to a fruit jelly having a pH of between about 2.5 and 3.6.

In many of these sugar-containing food compositions as little as 1% or even down to 0.2% of the finely divided special oat fraction may be employed to give desirable characteristics.

In all these products the finely divided special oat fraction is preferably added to the sugar containing food composition before or during an elevated temperature treatment of at least 150° F. and desirably between 190° F. and 235° F. or more to develop the unusual physical, plastic, and viscous properties and the retardation of the stickiness observed.

Among the food icings for addition to which the finely divided special oat fraction of the present invention may be used are included cake icings including cholocate icings, vanilla icings and the like with or without added flavoring materials whether natural or synthetic.

Among the confections there are included candies such as hard candies, cough drops and the ordinary variety of glycerine cough drops, fruit drops, candy fillings such as used in the ordinary five cent candy bars, caramels, toffees, marshmallows, nougats, candy coatings and fruit candies. There may also be included macaroons which are high in sugar and which are also subject to stickiness under conditions of high temperature and high humidity and where the special oat fraction of the present invention may be added to the ingredients of that product. Where a high sugar containing sugar coating is applied to a food composition the special oat fraction may be incorporated therein desirably prior to an elevated temperature treatment such as boiling or concentration.

The desirable physical characteristics are obtained without respect to the pH of the food composition as the special oat fraction retains its desirable physical characteristics even within wide ranges of pH such as between pH 2 and pH 10.

Still further and unusual results are obtained by first extracting the special oat fraction of the present invention to render it substantially fat free or with at least 75% of its fat removed.

Among the solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is very readily pulverized to the desired point of at least about 75 mesh and desirably to about 90 mesh.

There may also where desired be incorporated along with the special oat fraction or the fat extracted special oat fraction minor amounts of mono-glycerides or di-glycerides or minor amounts of polyhydric alcohols in which at least one of the hydroxyl groups is free and in which at least one of the hydroxyl groups is replaced by a fatty acid radical or minor amounts of polyhydric alcohol esters. For example, the special oat fraction may be combined with a mono- or di-glyceride or with such polyhydric alcohol esters as glyceryl-mono-oleate, glyceryl-monostearate, glyceryldistearate, diethylene glycol (mono or di) stearate, diethylene glycol (mono) oleate or any similar ester of a polyhydric alcohol having at least one free hydroxyl group. These combinations are very efficacious where it is desired to incorporate large quantities of air but at the same time retain high viscosity, heavy body and the non-sticking and non-crystallizing characteristics obtained in accordance with the procedures of the present invention.

The above polyhydric alcohol esters may be mixed mechanically with the special oat fraction but preferably a paste or aqueous dispersion is prepared in which the special oat fraction is dispersed in water such as in from 5 to 15 parts of water for each 1 part of the finely divided special oat fraction followed by adding thereto the polyhydric alcohol ester or similar composition, which combination is then placed through a colloid mill or homogenizer to thoroughly disperse the polyhydric alcohol ester therethrough followed preferably by drying as on a drum drier or by tray drying or by similar dehydration to produce a composite mass in which the polyhydric alcohol ester is thoroughly dispersed in and through the special oat fraction.

Whereas normally these polyhydric alcohol esters "oil off" or come to the surface when added to any aqueous composition and thereby present a major difficulty when trying to obtain a uniform dispersion of the esters through the food composition, where the polyhydric alcohol ester is first combined with the special oat fraction of the present invention an unusual colloid appears to be formed whereby the polyhydric alcohol ester is uniformly dispersed throughout the food composition and remains dispersed therethrough without the oily composition coming to the surface and without "oiling off."

It has furthermore been found that synergistic effect is obtained on combining the polyhydric alcohol esters with the special oat fraction of the present invention whereby the relative efficiency of the polyhydric alcohol ester is materially increased when combined with the special oat fraction of the present invention over that obtained where the polyhydric alcohol ester is combined with gelatin or similar stabilizer.

Where desired, the special oat fraction may first be dispersed in water such as when using 1 part of the special oat fraction to between 4 and 10 parts of water followed by allowing the combination to stand for a short period of time such as up to about several hours and then followed by drying and pulverizing whereby the full stabilizing effect of the special oat fraction will have been developed and where no further time period will be required to develop the maximum stabilizing activity. During the time that the special oat fraction is allowed to stand in water an elevated temperature may be employed such as up to about 175° F.

The special oat fraction in aqueous suspension may also be utilized as the medium in which vitamin oil concentrates and particularly vitamin A and D concentrates although also including other fat soluble vitamins such as vitamins K or E, the tocopherols or wheat germ oil, may be homogenized. Under these circumstances the oils are readily held in suspension in stabilized form and the resultant product may where desired be dried such as on a drum drier or by other similar drying means.

By the term "total protein" as used in the claims of this application is meant the total amount of protein present in the special oat fraction of the present application.

By the term "finely divided" as used in connection with the special oat fraction of the present invention in the application and claims is meant the oat fraction which has been subdivided to a state of fineness that will enable it to go through at least about a 50 mesh screen.

The present application is a continuation in part of application Serial No. 510,831 filed November 17, 1943 entitled "Food composition."

Having described my invention, what I claim is:

1. A food composition containing at least 20% of a sugar, said food composition comprising as an ingredient a small amount of a finely divided, dry milled oat product, said oat product containing in excess of about 20% total protein and said oat product having a relatively low starch and a relatively high protein content as compared to dehulled oats.

2. A cake icing comprising as an ingredient a small amount of a finely divided, dry milled oat product, said oat product containing in excess of about 20% total protein and said oat product having a relatively low starch and a relatively high protein content as compared to dehulled oats.

3. A confection comprising as an ingredient a small amount of a finely divided, dry milled oat product, said oat product containing in excess of about 20% total protein and said oat product having a relatively low starch and a relatively high protein content as compared to dehulled oats.

4. A jelly composition comprising as an ingredinet a small amount of a finely divided, dry milled oat product, said oat product containing in excess of about 20% total protein and said oat product having a relatively low starch and a relatively high protein content as compared to dehulled oats.

5. A food composition containing at least 20% of a sugar, said food composition comprising as an ingredient a small amount of the finely divided coarse fraction of dehulled oats, said fraction being substantially free of those particles which will go through a 60 mesh screen when the dehulled oats are ground to a fineness that will permit a major proportion thereof to pass through a 60 mesh screen.

6. A food composition containing at least 20% of a sugar, said food composition comprising as an ingredient a small amount of the coarse fraction of dehulled oats, said fraction having a fineness of at least about 60 mesh, said fraction being substantially free of those particles which will go through a 60 mesh screen when the dehulled oats are ground to a fineness that will permit 80% to 90% thereof to pass through a 60 mesh screen, and said fraction containing at least about 22% total protein.

7. A cake icing comprising as an ingredient a small amount of the finely divided coarse fraction of dehulled oats, said fraction being substantially free of those particles which will go through a 60 mesh screen when the dehulled oats are ground to a fineness that will permit 80% to 90% thereof to pass through a 60 mesh screen, and said fraction containing at least about 22% total protein.

SIDNEY MUSHER.